May 20, 1941.  G. C. WESTBY  2,243,044
TREATMENT OF SILICA ORES
Filed April 17, 1937
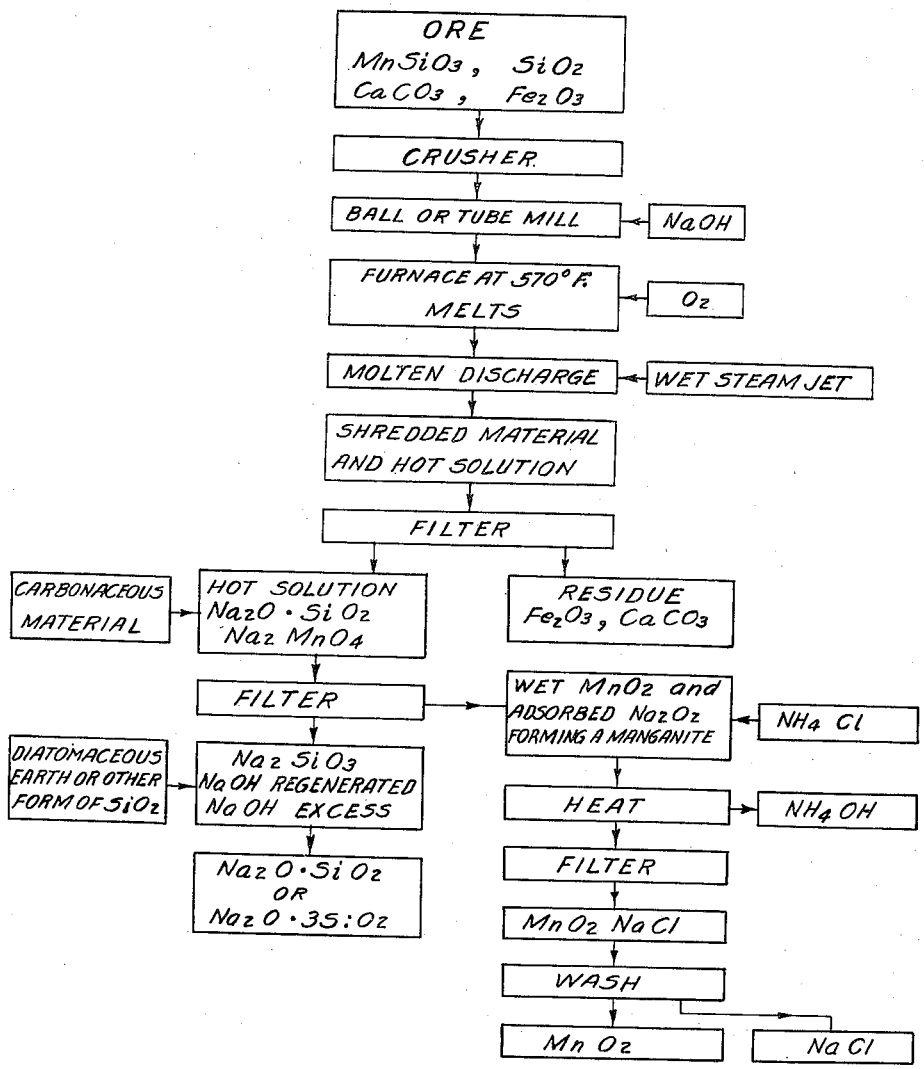
INVENTOR.
George C. Westby
BY Paul Blien
ATTORNEY.

Patented May 20, 1941

2,243,044

UNITED STATES PATENT OFFICE 2,243,044

TREATMENT OF SILICA ORES

George C. Westby, Seattle, Wash., assignor to Soluble Silicates Process Company, Inc., a corporation of Washington Application April 17, 1937, Serial No. 137,594

4 Claims. (Cl. 23—110)

This invention relates to an improved commercial process and apparatus for treating silicates, silicate ores, mixed silicate and oxide ores, or sulphide ores containing silica, to produce an alkaline silicate from which to derive water glass or other commercially pure silicates while concurrently producing metallic oxides, sulphides, or other concentrates.

The main object of the process is to simplify the method and reduce the cost of producing water glass and various metals through the act of deriving valuable constituents of the original ores by means of an alkaline or alkaline earth metal reagent, regenerating, if desired, the original reagent or an effective substitute therefor.

A specific object is to accelerate the reactions induced by the application of the process by providing physical factors secured by (1) fine grinding, (2) development of an easily soluble alkaline silicate, (3) use of excess reagent, (4) use of pressure in excess of atmospheric, (5) use of heated solutions, (6) rapid circulation of reacting substances, and (7) abrasion of the pulverulent material of reaction in order to remove inert compounds from the surface of ore particles.

An important specific object is to provide for the elimination of alkaline combinations intimately adsorbed by precipitated oxides or other forms developed in the process.

In order to make apparent the general operation of the process, I submit the course to be followed in a special case. Silicate or manganese ores are chosen for illustration to show the method of producing water glass and free oxides of manganese by means of my process. The reactions on which the process in this special case depend are as follows:

(1) $MnSiO_3 + 4NaOH + O_2 = Na_2MnO_4 + Na_2SiO_3 + 2H_2O$
(2) $SiO_2 + Na_2SiO_3 = Na_2Si_2O_5$
(3) $NaAlSi_3O_8 + 2NaOH = Na_2O.3SiO_2 + NaAlO_2 + H_2O$
(4) $4Na_2MnO_4 + C_2 + 4H_2O = 4MnO_2 + 8NaOH + 2CO_2$
(5) $4NaMnO_4 + 2H_2O = 4MnO_2 + 4NaOH + 3O_2$
(6) $6NaMnO_4 = 2Na_2MnO_3 + (Na_2MnO_4 + 3MnO_2) + 4O_2$
(7) $2NaMnO_4 = Na_2MnO_4 + MnO_2 + O_2$
(8) $Na_2SiO_3 + CO_2 + H_2O = Na_2CO_3 + H_2SiO_3$
(9) $Na_2SiO_3 + Ca(OH)_2 = 2NaOH + CaSiO_3$

As in most commercial processes it is necessary to establish fixed conditions in order to approximate the definite result indicated in the reactions. I provide in the present process for variations introduced by commercial necessity and claim as novel the steps so taken by me which are introduced as part of the process.

In carrying out the process as applied to the treatment of silicified manganese ore, I prefer to use caustic soda as the primary alkaline reagent although other alkaline reagents or sodium sulphate and carbon would serve. In general, mixed ore and caustic are charged into a cast iron treatment chamber wherein a temperature preferably approximating 570° F. is maintained in an oxidizing atmosphere, thus effecting decomposition of the ore to form a silicate of soda varying in composition from $Na_2O.SiO_2$ to $Na_2O.2SiO_2$, also sodium manganate with varying amounts of sodium permanganate. Depending on the composition of the ore, introduction of elements as sodium, potassium, aluminum, iron, lime and magnesium may occur in the melt.

The molten material as discharged from the furnace is shredded preferably by wet steam under pressure, but a wet air jet or an alkaline solution jet under pressure might be used.

Soluble water glass and sodium manganate form in the strongly alkaline solution while iron oxide, calcium and magnesium carbonates separate out under the established condition as an insoluble residue which may be discharged as a discard or retreated as desired. The insoluble residue is filtered off and the hot solution of water glass and sodium manganate is transferred to a tank, while still hot carbonaceous material such as crude sugar, pulverized coal, sawdust, etc., being added to the alkaline solution. Hydrated manganese oxide separates out of solution with regeneration of sodium hydrate (Equation 4). The strongly alkaline solution of sodium silicate may be charged into the milling circuit, discharging to the furnace, or preferably mixed with silica (diatomaceous earth) in proportions to form any desired ratio of soda to silica by heating the same under pressure in a preferred form of apparatus to be later described.

The precipitated hydrated oxide is washed and dried but it is necessary in order to form an oxide suitable for battery or paint pigment uses to eliminate adsorbed soda compounds. I have found even after much boiling that a residuum remains. To overcome the difficulty I add, to the wetted oxide, ammonium chloride in sufficient amounts to react on the sodium hydrate compound and form ammonia and sodium chloride. Free ammonia is boiled off, recovered as such or ammonium chloride is regenerated as in the ammonia-soda process. The sodium chloride is easily washed from the oxide residue. Use of an ammonium salt is made in the case of any alkaline separation of solids in the general application of my process with occasional use of the hydrochloric acid incidentally generated in the decomposition of ammonium chloride.

In certain cases as in the elimination of calcium carbonate or oxide from a manganese residue I would utilize $NH_4Cl$ as in the equation:

$$CaCO_3 + 2NH_4Cl = CaCl_2 + (NH_4)_2CO$$

Where economic conditions are such that chlorine may be cheaply generated as in the manufacture of sodium hydrate which is used in my process, I would utilize the gas in neutralizing the adsorbed sodium in residues and form hypochlorites of the metal.

The preferred form of apparatus is adapted to the complete cycle of treatment wherein it is essential that all parts of the process are interlocking in the derivation of water glass, separation of metal compounds from the water glass solution, and elimination of impurities from the concentrates so that the ultimate cost of chlorinating adsorbed alkali is balanced by a generation of a more valuable reagent.

As a general flow sheet wherein manganese ore is treated, the following is given:

are added to the mill to avoid dusting as well as to insure intimate wetting of particles, provide a carrying agent for the alkali in aqueous solution, initiate action of the alkali on free quartrose material, and thoroughly mix the mass in preparation for discharge to the furnace hopper.

An automatic feeder continuously charges the mixed materials to the furnace.

The furnace may consist of several forms but the preferred type utilizes caustic soda at temperatures approximating 600° F. under atmospheric pressure. A cast iron pan made up of lapping plates to form steps which work downwardly toward the discharge forms the furnace hearth which is covered by a silica brick reverberatory-form roof supported by refractory side walls. The furnace is rectangular and preferably furnished with vertical cast iron stirrers operating through water-cooled apertures in the roof, the stirrers in the case of manganese ores acting to accelerate aeration of the charge and in general to abrade the ore particles in order to positively remove inactive substances from the surfaces of the particles and to prevent local concentrations of alkali or alkaline or silicate compounds. There should be a slow continuous current of molten material through the furnace from the elevated head end toward a discharge

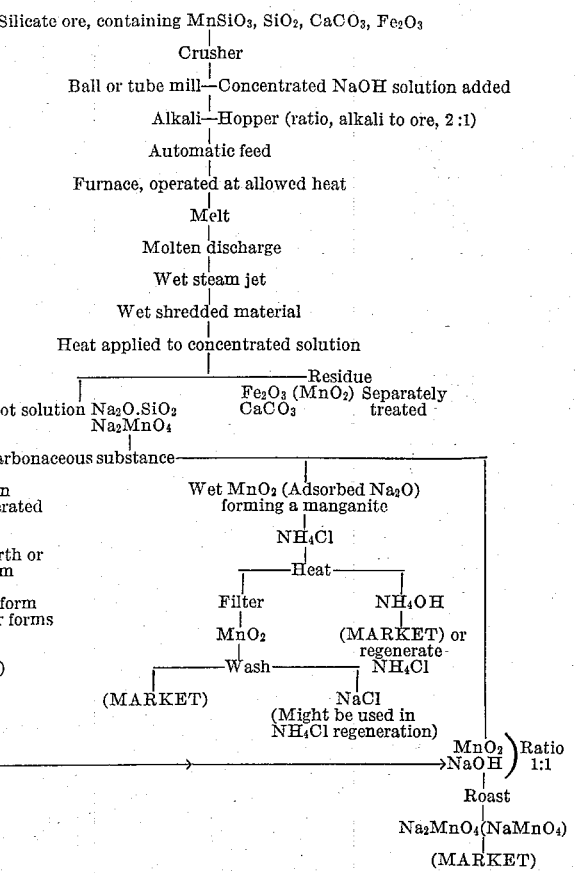

Due to insoluble impurities that may form on ore particles as they are reacted on there is in some cases a tendency for the primary action to become much slower as the cycle of the process proceeds. For this reason a special form of apparatus has been developed by me but while it accelerates the process it is not essential to the operation of the method. With reference to the referred-to fine grinding, this is performed by recognized crushing and pulverizing equipment but hot alkaline solutions and the alkaline charge which may consist of a covered launder arranged to cascade the molten stream while kept hot by the confined furnace gases.

As the molten material leaves the launder in a free falling stream it is shredded by means of a jet of wet steam or by a blast of wet air or an alkaline or other reagent liquid stream. By this means the heat of the melt is conserved and a concentrated hot solution is formed which is regulated to a strength best adapted to the preparation of the desired water glass. After separation of the metallic by-product from the alkaline water glass solution, the liquid is charged with the computed silica required for formation of the desired specific silicate and introduced into the apparatus used in manufacture of water glass.

A form of apparatus which I have designed for this purpose insures removal of calcareous and other inert surface impurities by means of abrasion and thoroughly and continuously agitates under pressure the whole alkali-silica-alkaline-silicate mixture.

The material is fed into a Pachuca-like tank and drawn into a force pump from the hopper of the tank, being discharged under pressure through a system of hot roughened or rifled pipes back to the hoppered tank until the desired action is complete. The residues are allowed to settle out in a stock tank and the clarified liquor is concentrated to the required specific gravity to produce marketable water glass.

In the special treatment of a silicate of manganese ore it is not intended to imply restriction to the production of oxides of manganese concurrently with water glass. If economic conditions are favorable I produce ferro-manganese directly in an electric or blast furnace utilizing the alkaline reagent, directly reducing the sodium manganate formed such that sodium manganates of continuously diminishing oxygen content finally break down to manganous oxide which is reduced to ferro-manganese in the presence of iron with a coincidental formation of sodium silicate.

In the latter case the molten sodium silicate is returned to circuit until the silicate degree desired is approximated, being then shredded and dissolved by means of a wet steam jet.

Having thus described my invention, I claim:

1. The process of treating manganiferous silicate ores to obtain the silica in the form of water glass and the manganese in concentrated form consisting in heating the ore in a pulverulent state with an excess of caustic soda in a furnace, maintaining therein an oxidizing atmosphere and producing a fused mass of sodium hydrate, sodium manganate, sodium permanganate, sodium silicate, sodium ferrate, and a suspended unacted-on residue, shredding the molten stream as the same issues from the furnace in the presence of an aqueous solution to disintegrate the stream and leave the undissolved residue while taking the soluble components of the melt into solution, treating the hot alkaline solution, consisting of sodium manganate, sodium permanganate, sodium silicate and sodium hydrate, with a carbonaceous substance to precipitate hydrated manganese dioxide and regenerate caustic soda while maintaining sodium silicate in solution, extracting sodium compounds from the manganese dioxide precipitate by adding an ammonium salt, recovering ammonia, washing the oxides, and concurrently treating the alkaline sodium silicate solution to form marketable water glass.

2. The process of treating manganiferous silicate ores to obtain the silica in the form of water glass and the manganese in concentrated form consisting in introducing the ore in a pulverulent state and with an excess of caustic soda to a furnace, maintaining an oxidizing atmosphere while heating the same to produce a fused mass of sodium hydrate, sodium manganate, sodium permanganate, sodium silicate, sodium ferrate, and a suspended unacted-on residue, shredding the molten stream as the same issues from the furnace in the presence of an aqueous solution to disintegrate the stream and leave the undissolved residue while taking the soluble components of the melt into solution, treating the hot alkaline solution of sodium manganate, sodium permanganate, sodium silicate and sodium hydrate with a carbonaceous substance to precipitate hydrated manganese dioxide and regenerate caustic soda while maintaining sodium silicate in solution, extracting sodium compounds from the manganese oxide precipitate by addition of an ammonium salt, and recovering ammonia and washing the oxides while concurrently treating the alkaline sodium silicate solution with lime to precipitate calcium silicate and regenerate caustic soda, concentrating the caustic soda solution, and cyclically re-using the alkali in the ore treatment.

3. The process of treating manganiferous silicate ores to obtain the manganese in concentrated form, comprising: sufficiently heating such an ore in a pulverulent state with an excess of caustic soda, while maintaining said ore in an oxidizing atmosphere, to produce a fused mass of sodium hydrate, sodium manganate, sodium permanganate, sodium silicate, sodium ferrate, and a suspended unacted-on residue, forming and discharging a molten stream from said fused mass, shredding in the presence of water said stream to disintegrate the stream and leave the undissolved residue while taking the soluble components of the stream into solution, and treating the resulting hot alkaline solution of sodium manganate, sodium permanganate, sodium silicate, and sodium hydrate with a carbonaceous substance to precipitate hydrated manganese dioxide.

4. The process of treating manganiferous silicate ores to obtain the manganese in concentrated form, comprising: sufficiently heating such an ore in a pulverulent state with an excess of caustic soda, while maintaining said ore in an oxidizing atmosphere, to produce a fused mass of sodium hydrate, sodium manganate, sodium permanganate, sodium silicate, sodium ferrate, and a suspended unacted-on residue; forming and discharging a molten stream from said fused mass, shredding in the presence of an aqueous solution said stream to disintegrate the stream and leave the undissolved residue while taking the soluble components of the stream into solution, treating the resulting hot alkaline solution of sodium manganate, sodium permanganate, sodium silicate, and sodium hydrate with a carbonaceous substance to precipitate hydrated manganese dioxide, and using the resulting solution as the aqueous solution in the presence of which the molten stream is shredded.

GEORGE C. WESTBY.